April 17, 1962 G. L. HEATON ET AL 3,030,226
METHOD FOR COATING CONDUIT SECTIONS
Original Filed March 25, 1955 6 Sheets-Sheet 1

GEORGE L. HEATON &
ARTHUR H. VAUGHAN,
INVENTORS.

HERZIG & JESSUP,
ATTORNEYS.
BY

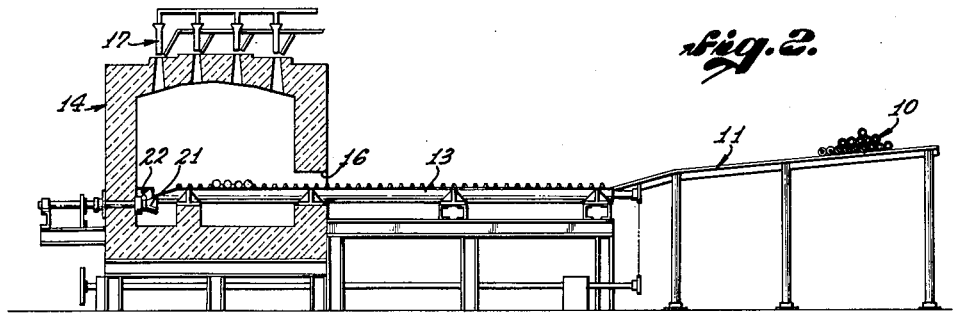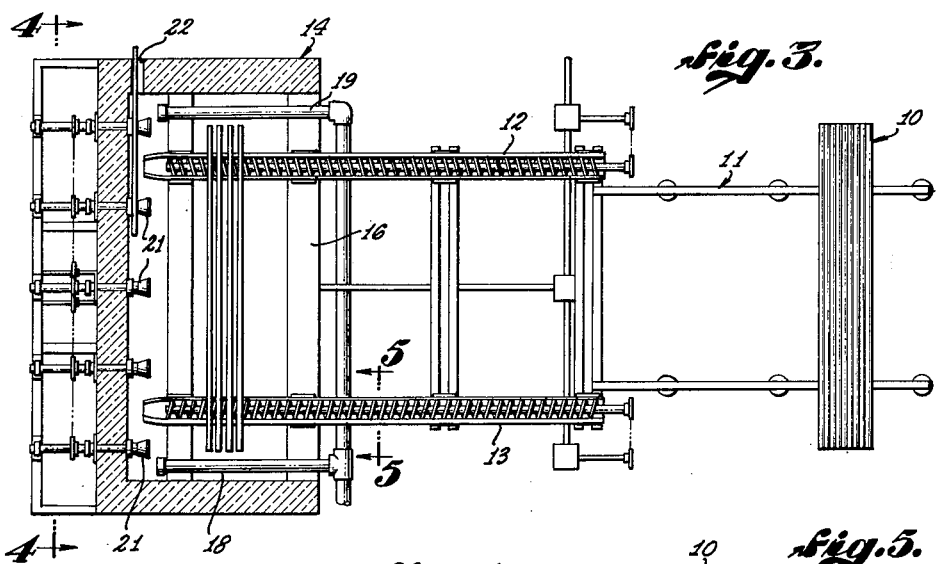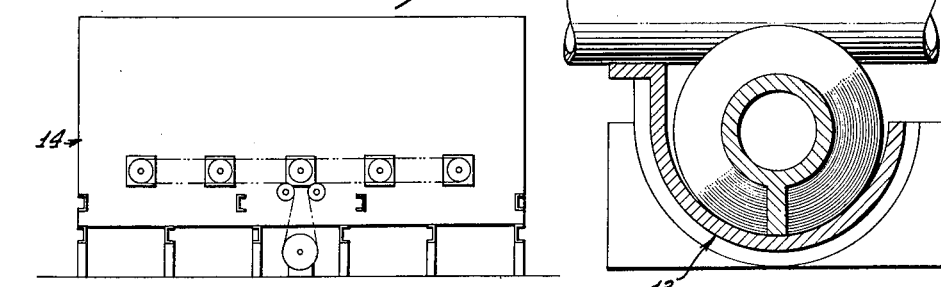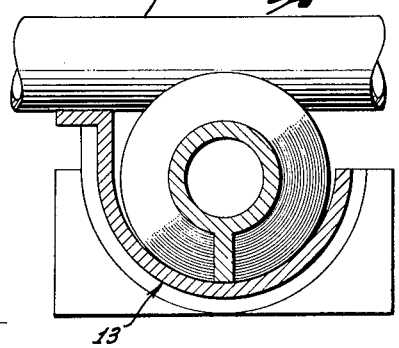
GEORGE L. HEATON &
ARTHUR H. VAUGHAN,
INVENTORS.
HERZIG & JESSUP,
ATTORNEYS.
BY

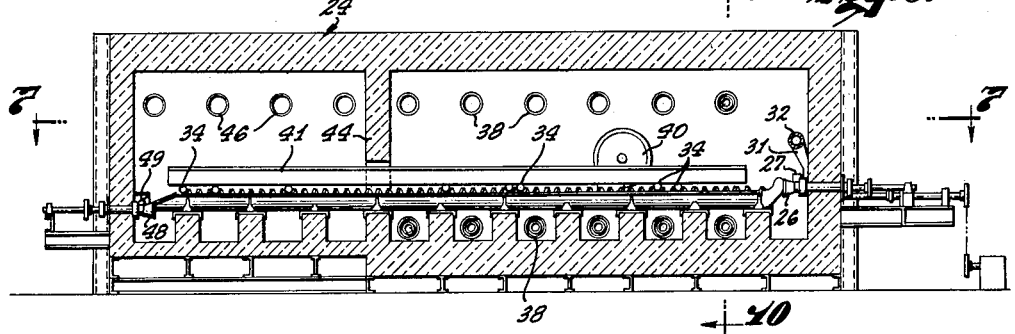

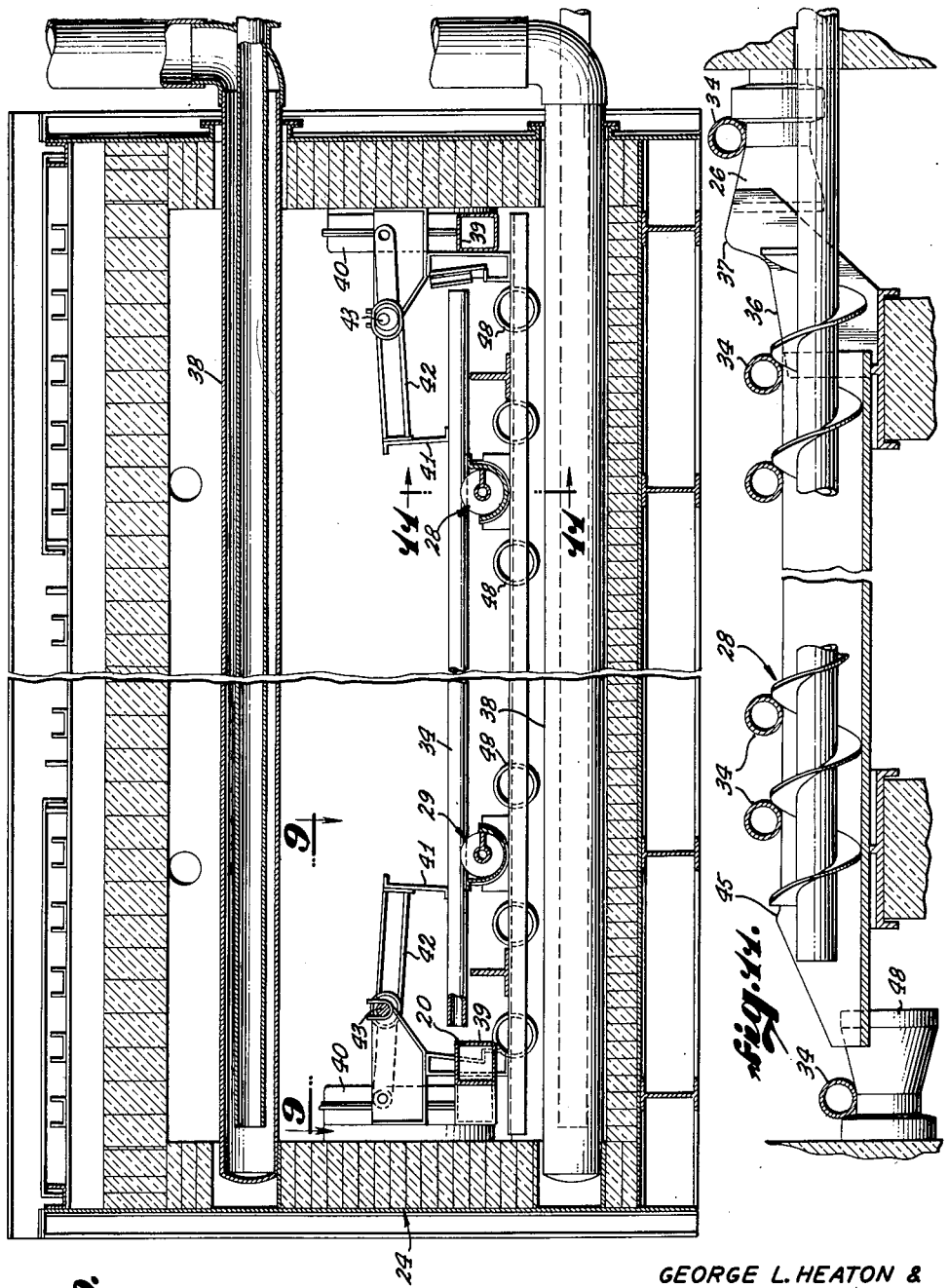

April 17, 1962  G. L. HEATON ET AL  3,030,226
METHOD FOR COATING CONDUIT SECTIONS
Original Filed March 25, 1955  6 Sheets-Sheet 5

GEORGE L. HEATON &
ARTHUR H. VAUGHAN,
INVENTORS.

HERZIG & JESSUP,
ATTORNEYS.
BY

April 17, 1962 G. L. HEATON ET AL 3,030,226
METHOD FOR COATING CONDUIT SECTIONS
Original Filed March 25, 1955 6 Sheets-Sheet 6
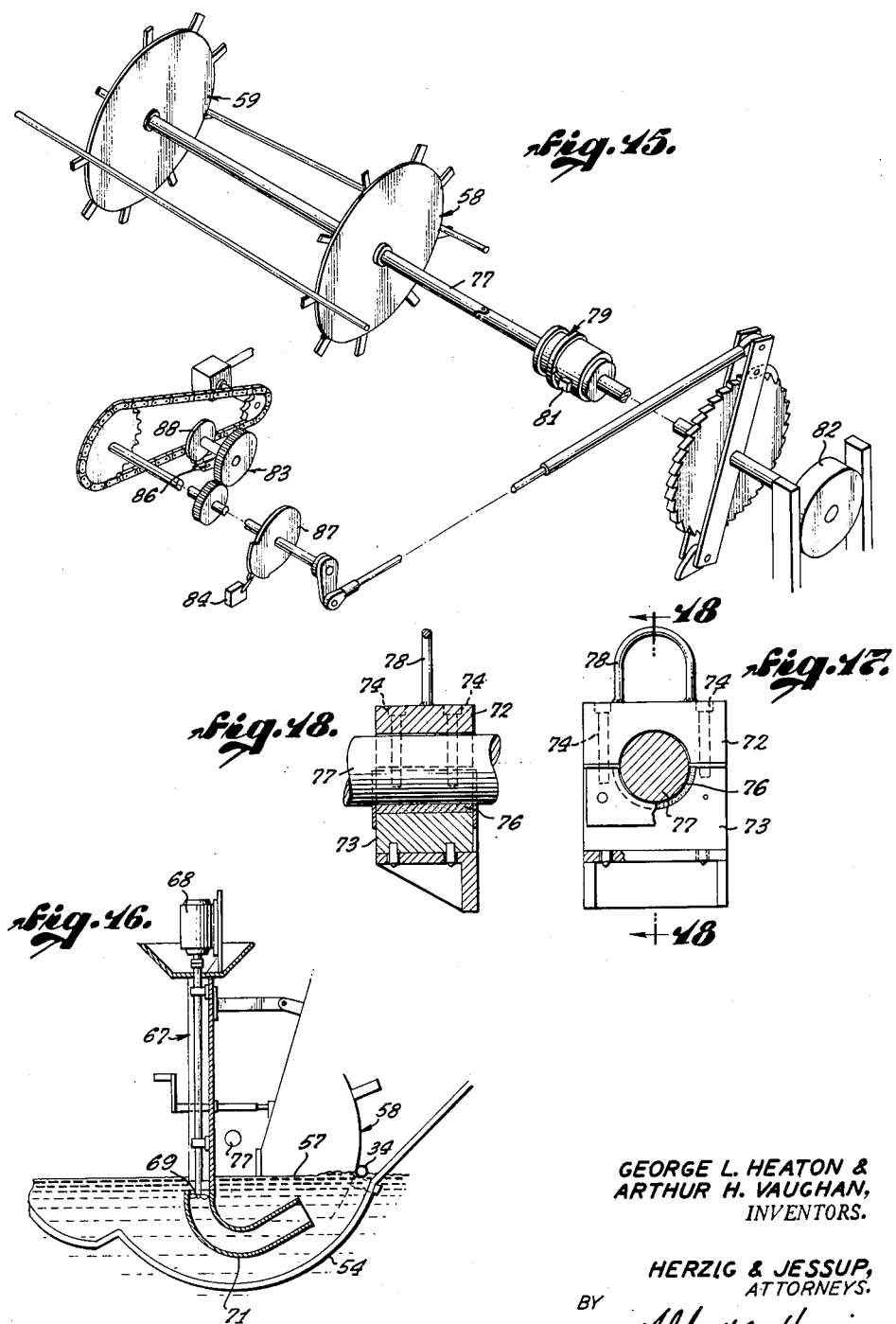
GEORGE L. HEATON &
ARTHUR H. VAUGHAN,
INVENTORS.
HERZIG & JESSUP,
ATTORNEYS.
BY

United States Patent Office 3,030,226
Patented Apr. 17, 1962

3,030,226
METHOD FOR COATING CONDUIT SECTIONS
George L. Heaton, Torrance, Calif., and Arthur H. Vaughan, Salem, Ohio, assignors, by mesne assignments, to Rome Cable Corporation, Rome, N.Y., a corporation of Delaware
Original application Mar. 25, 1955, Ser. No. 496,836, now Patent No. 2,906,238, dated Sept. 29, 1959. Divided and this application May 26, 1959, Ser. No. 815,908
3 Claims. (Cl. 117—51)

The present invention relates to coating conduit sections with molten material, both inside and out, particularly to coating metal conduit with a protective metal coating, and more particularly to galvanizing steel conduit sections both inside and out.

Reference is here made to U.S. Patent No. 2,110,893, issued to T. Sendzimer on March 15, 1938, for a "Process for Coating Metallic Objects With Layers of Other Metals."

The continuous and efficient coating of the internal and external surfaces of conduit sections poses difficult engineering problems. This is especially true in the case of coating metal conduit with metal coatings. In the internal and external galvanizing of rigid steel conduit, for example, for the protection of electrical systems, it is necessary to continuously pass conduit sections through a series of operations. To do this effectively on a mass production basis, carefully designed automatic machinery and control means are required.

Furthermore, the coating on the conduit sections must, among other things, be uniformly and strongly adherent and must withstand treatment such as bending as well as to resist corrosion. In the case of electrical conduit, the coating should be smooth to offer low friction for easy pulling and the finished conduit should have uniformly good bending qualities.

This application is a division of application Ser. No. 496,836, filed March 25, 1955, now Patent No. 2,906,238.

Accordingly, an important object of the present invention is to provide a method and apparatus for coating conduit, both inside and out, with a continuous, uniform coating of molten material.

Another object is to continuously coat metal conduit sections, both inside and out, with a strongly adherent, uniform coating of protective metal.

An additional object is to continuously and efficiently coat ferrous metal conduit sections with a uniform, strongly adherent protective coating of zinc- and zinc alloy.

These and other objects will be apparent upon reading the following description:

Broadly stated the present invention comprises the provision of a method and apparatus for continuously moving conduit through a series of operations, including cleaning and preparing the internal and external surfaces of the sections, such as by oxidizing and burning organic matter therefrom, forming a bonding surface on the cleaned sections, such as by reducing the oxide surface to a clean metallic surface, dipping the reduced conduit sections in a bath of molten coating material to coat the internal and external surfaces thereof, and removing or wiping the excess of coating material from the internal and external surfaces of the conduit sections. The apparatus employed comprises, in series arrangement, an oxidizing furnace, a reducing furnace, a molten coating material tank or pot and a wiping apparatus together with an interconnecting synchronized conveyor system and power drive means for continuously and automatically moving conduit sections through the furnaces, dip tank, and wiping apparatus under controlled operating conditions.

A more detailed description of a specific embodiment of the method and apparatus of the invention as applied to galvanizing steel conduit sections is given with reference to the drawings, wherein:

FIGURE 2 is a partial vertical cross-sectional view taken on the line 2—2 of the oxidizing furnace shown in FIGURE 1;

FIGURE 3 is a partial cross-sectional plan view of the oxidizing furnace and auxiliary equipment shown in FIGURE 2;

FIGURE 4 is an elevational view of the oxidizing furnace shown in FIGURE 3 taken along the line 4—4;

FIGURE 5 is a detail cross-sectional view taken on the line 5—5 of FIGURE 3 and showing a screw conveyer and a portion of a conduit section;

FIGURE 6 is a vertical cross-sectional view taken on the line 6—6 of FIGURE 1 and showing the reducing furnace and auxiliary equipment;

FIGURE 7 is a cross-sectional plan view of the oxidizing furnace taken on the line 7—7 of FIGURE 6;

FIGURE 8 is an elevational view taken along the line 8—8 of FIGURE 7 and showing the operation of a conduit section transfer arm;

FIGURE 9 is a partial detail view taken along the line 9—9 of FIGURE 10 and showing a screw conveyor, tube hold-down and guide mechanism and associated gas injection equipment;

FIGURE 10 is a vertical cross-sectional view of the reducing furnace and auxiliary equipment taken on the line 10—10 of FIGURE 6;

FIGURE 11 is a partial, broken elevational view taken along the line 11—11 of FIGURE 10 and showing a screw conveyer associated with transfer rollers at each end thereof;

FIGURE 12 is a vertical sectional view taken on the line 12—12 of FIGURE 1 and showing a star wheel conveyer together with associated guide and transfer mechanism positioned in a zinc pot;

FIGURE 13 is a similar view taken on the line 13—13 of FIGURE 12 and showing a magnetic roller conveyer for withdrawing galvanized conduit sections from the zinc pot;

Figure 1:
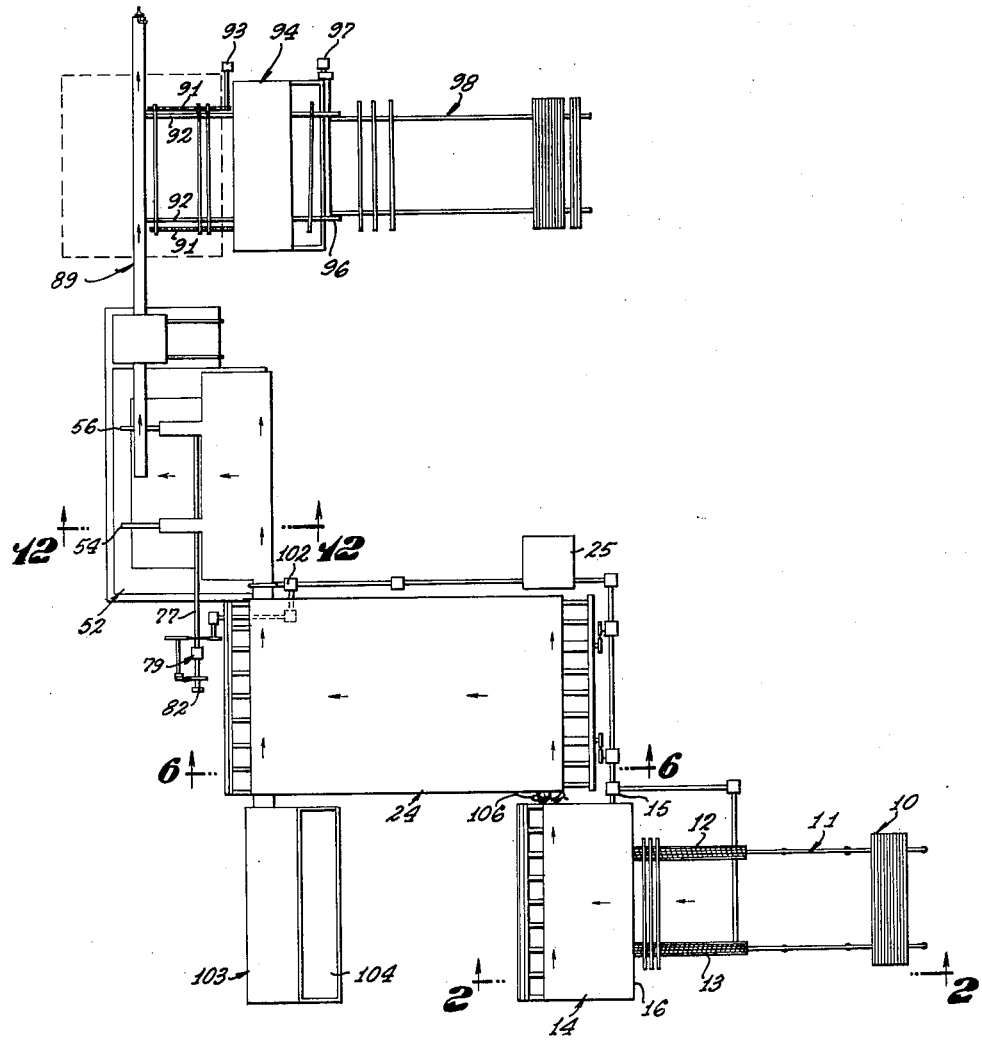
FIGURE 1 is a diagrammatic plan view showing the apparatus in series flow arrangement.
Figure 42:
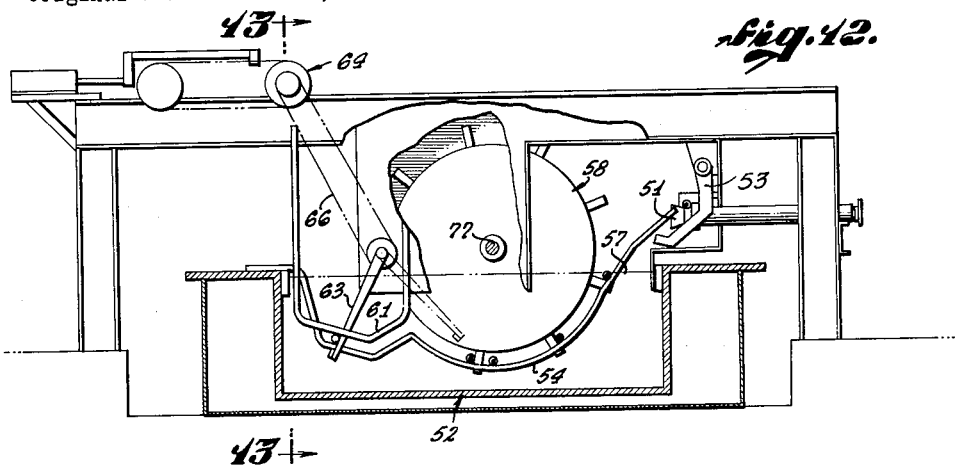
Figure 43:
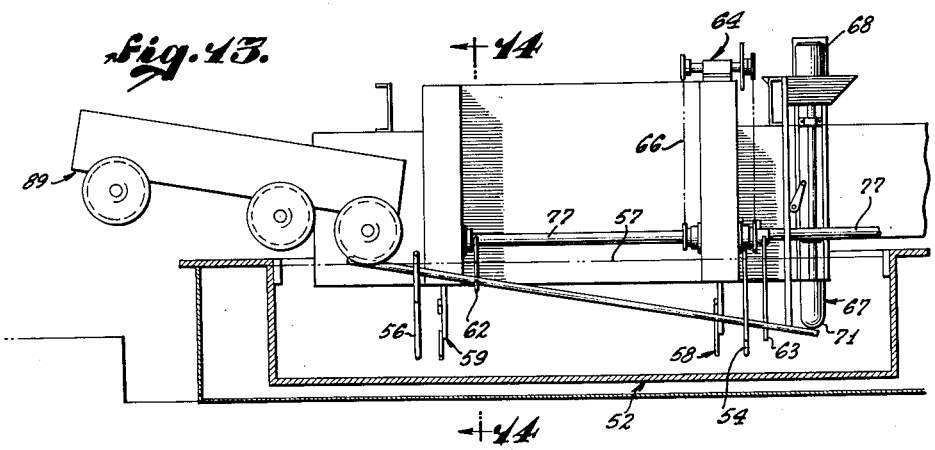
Figure 44:
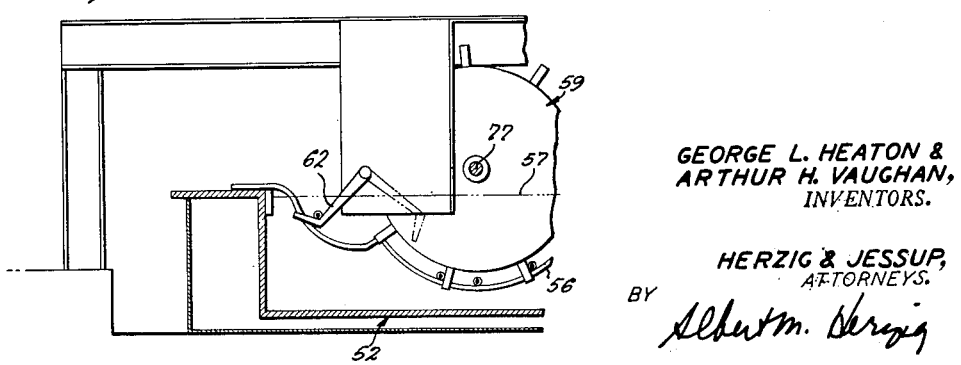

FIGURE 14 also is a similar view taken on the line 14—14 of FIGURE 13 and showing the star wheel conveyer associated with the guide and transfer mechanism in the zinc pot;

FIGURE 15 is a partial perspective view showing the star wheel conveyer and associated control mechanism;

FIGURE 16 is an elevational view showing a zinc pump mounted above the zinc pot adjacent the star wheel conveyor;

FIGURE 17 is an end view of a star wheel bearing; and

FIGURE 18 is a cross-sectional view of the star wheel bearing of FIGURE 17 taken along the line 18—18.

Steel conduit sections 10 are obtained from a pipe or tube mill in predetermined length and diameter and contain more or less grease and oil both internally and externally. These conduit sections are spread out in parallel arrangement on the skids of loading rack 11, and each section in turn is engaged simultaneously at two points in end threads of parallel screw conveyers 12 and 13. Screw conveyer 12 is provided with a right-hand thread and is driven in a counter-clockwise direction and screw conveyer 13 is provided with a left-hand thread and is driven in a clockwise direction. Thus by means of screw conveyers 12 and 13 a series of conduit sections arranged parallel to each other is continuously conveyed into an oxidizing furnace 14 through an opening in the side thereof as shown at 16.

The chamber of furnace 14 preferably is maintained at a temperature just below about 900° F. and especially at about 700 to 1000° F., by means of flame heaters 17. The heaters 17 are positioned on the furnace so that conduit sections at 16 are uniformly heated and carbonaceous matter is burned from both the internal and external surfaces thereof and a thin, uniform coating of iron oxide is formed over the entire surface of the sections both internally and externally. The iron oxide coating produced is not a definite scale, but is a tightly adherent coating. Types of heaters other than flame heaters can be used for this purpose.

To facilitate the cleaning and oxidizing of internal surfaces of the conduit sections, air is injected inside the individual sections by means of an air injection pipe 18. The pipe 18 is provided with a series of slots, such as slots 20 shown on FIGURE 9, along the inner wall thereof adjacent the ends of the conduit sections so that jets of air are continually injected into and through the interiors of the conduit sections. A second compressed air conduit 19, similar to that shown at 18, is placed at the other end of the oxidizing furnace 14 and the slots therein are arranged so that the jets of air issuing therefrom do not oppose the jets from slots in pipe 18. In this manner, air is assured passage through the heated conduit sections without interference from opposite sides of the sections. As the cleaned and oxidized conduit sections approach the far side of oxidizing furnace 14, they are forced off the end of screw conveyers 12 and 13 and onto transfer conveyer rollers 21. Retarding risers, such as risers 45, shown in FIGURE 11, are provided to effect a uniform time sequence between tubes.

The rollers 21 continuously transfer the oxidized conduit sections from oxidizing furnace 14, through a small opening 22 in the end wall of the furnace and through a similar opening 23 (FIG. 7) in the end wall of adjoining reducing furnace 24. A similar set of rollers 26, continuously moves the conduit sections into the end portion of reducing furnace 24 until they contact a stop 27. Rollers 21 and 26 are tied in with the main drive motor 25 to give constant timing at all speeds between the oxidizing furnace 14 and the reducing furnace 24. The contacting of stop 27 by a conduit section sets in motion a transfer mechanism (not shown) which transfers the conduit section from rollers 26 to the ends of parallel screw conveyers 28 and 29.

The transfer from rollers 26 to the ends of screw conveyers 28 and 29 is accomplished by means of a series of retarding arms 31 (FIGURE 8) fixed to a rotatably mounted shaft 32. These arms assure a uniform time sequence between conduit sections and prevent cross-threading on the screws of the conveyers. The extremities of arms 31 are provided with hooks 33 which, upon rotation of shaft 32, engage a conduit section, such as 34, and as shown in phantom in FIGURE 8, urge the conduit section 34 from rollers 26 and transfer them to inclined edges 36 beyond shoulders 37. The conduit section 34 rolls against the ends of the screws of the conveyers 28 and 29 and is engaged by the end convolutions of the screws which preferably are made of somewhat greater diameter than the succeeding convolutions to provide a stop for the sections as they roll against the ends of the screws and to prevent cross threading. Also, the distances between the end convolution and the succeeding convolution in each screw preferably are made somewhat greater than the pitch to avoid cross threading in the screws and to facilitate the engagement of the conduit sections 34 without causing jam-ups in the furnaces.

The worm of conveyer 28 is provided with a right-hand thread and that of conveyer 29 is provided with a left-hand thread and the former is rotated in a counter-clockwise direction while the latter is rotated in a clockwise direction to convey conduit sections 34, at a uniform synchronized rate, through the reducing furnace 24. This rate is synchronized and connected in proper phase relationship with the rate of transfer of conduit sections through oxidizing furnace 14 by means of a variable coupling 15 or similar suitable arrangement between furnaces 14 and 24. A reverse gear also is included with variable coupling 15 for the purpose of emptying reducing furnace 24 in the event of operation difficulties.

Reducing furnace 24 is maintained at a tempertaure above about 1300° F., so that the conduit sections will be annealed to produce a uniformly soft and ductile, easily bendable conduit while the oxide coating thereof is reduced. The operating temperature of the reducing furnace preferably is maintained in the range of about 1350° F., by means of regenerating heaters 38, fired by means of gas combustion, for example. Other means of heating reducing furnace 24 can, of course, be employed. A hydrogen atmosphere is maintained in the reducing furnace 24 at a pressure slightly above atmospheric. The hydrogen for this purpose is produced by catalytic dissociation of ammonia and contains 25 percent by volume of nitrogen. Hydrogen can be prepared by any other desired method, and should be relatively free of components that react with iron or oxides of iron at elevated temperatures.

As the oxidized conduit sections are conveyed through reducing furnace 24, the oxidized coating on both the inside and outside surfaces of the conduits is reduced to a relatively pure, tightly adherent metal coating. This metal coating is relatively free of such undesirable impurities as carbon, sulphur, phosphorous and dissolved gases. To insure a freshly reduced coating of iron both inside and outside the conduit sections, a pipe 39 provided with a series of slits 20 along the inside length thereof is positioned along the side wall of the reduction furnace 24. Hydrogen gas is forced into the pipe 39 by means of a blower 40 and is injected into the ends of the conduit sections moving on the screw conveyers 28 and 29 through the slits 20. A similar pipe 39 is positioned along the other side of reducing furnace 24 and jets of hydrogen gas, staggered with relation to the first set of jets, similarly are injected into the ends of conduit sections as they pass through the reduction furnace.

Side guide members 41 are placed along both sides of the reducing furnace 24 to prevent the ends of the conduit sections from dragging against the brick walls of the furnace and bending or jamming. Conduit sections holddown members 41 are placed along both sides of the reducing furnace 24 and are supported by arms 42 (FIGURE 10) pivotally mounted at 43, the members 41 being disposed above the conduit sections near both ends thereof to hold the conduits in position in the screw conveyers 28 and 29 in parallel relationship to each other, as they move through the reducing furnace 24. The screw conveyers 28 and 29 are rotated in opposite directions, thereby conveying the conduit sections while the reverse rotation tends to prevent longitudinal movement of the conduit sections, in a lateral direction relative to the conveyers, thereby preventing the ends of the conduit sections from dragging against the brick walls of the furnace and bending or jamming. The members 41 may be rotated about their pivot points 43 to swing the hold-down means from an operative position in contact with the conduit sections near the end portions thereof to an inoperative position clear of conduit sections by manual rotation of the cranks extending outwardly of the furnace 24.

A portion of the reducing furnace 24, at the far end thereof, is partitioned off by means of partition 44. This portion of the furnace is maintained at a lower temperature than the reducing and annealing portion to cool the reduced and annealed conduit sections to a temperature approaching about 1000° F. so that they will gradually approach the temperature of the molten zinc bath (about 830° F.) before being dropped therein, to avoid shocking.

This is accomplished by passing cooling gases, at proper cooling temperatures, through the regenerating units, 46, in this portion of the furnace, instead of using them as heating means.

As each partially cooled, reduced conduit section reaches the end of the conveyers 28 and 29, it is forced by the screws thereof over the retarding riser 45 (FIGURE 11) at the end of each conveyer and then rolls from the screw conveyers onto transfer conveyer rollers 48. Rollers 48 transfer the reduced conduit sections from the cooling section of reducing furnace 24 through an opening 49 in the wall thereof and deliver the conduit sections to a similar set of transfer-conveyer rollers 51, located at the entrance side of a zinc pot 52 (FIGURE 12).

After each of the conduit sections on rollers 51 strikes a stop (not shown), retarding transfer arms 53, similar to retarding arms 31, are actuated and lift the conduit sections over the edges of rollers 51. In doing so, the conduit section is placed across the ends of runners 54 and 56 and is permitted to roll toward the surface 57 of the molten zinc in zinc pot 52. The conduit section in thus rolling comes into contact with the trailing edges of the spokes on star wheels 58 and 59.

The spokes of star wheel 58 are advanced 7° with respect to those of star wheel 59, so that the end of a conduit section contacting the spokes of the former star wheel is introduced below the surface 57 of the molten zinc in advance of the end of the conduit in contact with the spokes of star wheel 59. The latter end is the last to be submerged below the surface 57 of the zinc and, in being conveyed through the body of molten zinc in tank 52, is maintained at a higher level in the zinc bath than is the end first to be submerged, until passing the lowest point of travel, when the inclination is reversed.

During the passage of each of the conduit sections through the body of molten zinc, the peripheral edge of the star wheel serves as a hold down means to keep the conduit section submerged in the molten zinc. The runners 54 and 56 serve as guides defining the lower limit of the path along which the submerged conduit section moves through the body of molten zinc until it passes the arcuate portions of the runners.

At the far ends of the runners 54 and 56, are curved runner portions which guide the submerged galvanized conduit sections from beneath the star wheels 58 and 59 toward the exit side of the zinc pot 52. The lower end of the submerged conduit section is held down by a hold-down member 61, whereas the higher end of the conduit section is passed over the far end of the runner 56 and elevated by an actuated lift-arm 62, while the lower end of the conduit section is moved along between the far end of runner 54 and hold-down member 61 by a transfer arm 63. Arms 62 and 63 are actuated by power means indicated at 64 and connected to the arms by power transmission means 66.

To avoid the entrance of ash floating on the surface 57 of the molten zinc the interiors of the conduit section and forming an occlusion in the internal galvanized coating, it has been found desirable to install a zinc pump 67 (FIGURE 16) adjacent the point at which the highermost end of the conduit section enters the molten zinc bath. In the zinc pump a motor 68 drives a propeller 69 submerged below the surface of the zinc bath and introduced into the end of a section of bent pipe 71. The action of a propeller drives liquid zinc through the pipe 71 and into the surface layer of the zinc bath at the point at which the highermost end of the conduit section enters the bath. This action clears an area of the zinc bath surface 57, free of floating ash at the region in which the end of the conduit section enters the bath. It has been found that in this manner occlusion of ash in the internal wall of the conduit section is substantially completely avoided.

A special type of bearing has been developed for the star wheels to avoid difficulty with the molten zinc crusting on the bearing from time to time. This bearing, as shown in FIGURES 17 and 18, is composed of an upper half section 72 and a lower half section 73 held together by means of screw 74. A carbon bearing insert 76 is placed in the shaft support portion of the lower half 73 of the bearing assembly. The shaft 77 of the star wheel turns in the carbon insert 76. When it is desired to make changes in the bearing, or do maintenance work on the star wheels, the entire star wheel and bearing assembly is hoisted from the zinc pot by means of loops 78 attached to the bearings.

Attached to the shaft 77 of the star wheels is a safety device 79 adapted to avoid damage due to overloads, such as caused by jamming of the star wheels by jammed conduit sections, on the shaft by shutting off the power to the star wheels when an overload develops. This is accomplished by means of a cut-off switch 81 attached to the overload bearing 79. A friction brake 82 also is attached to the shaft 77 of the star wheels for fixing the star wheel in a given position when it is desired to do so during repair or maintenance operations, for example. A lift-arm control mechanism is shown at 83 for controlling the lift-arms 62 and 63 by means of switches 84 and 86 actuated by cams 87 and 88, respectively.

The galvanized conduit sections are then withdrawn from zinc pot 52 by any convenient means, preferably by means of a magnetic roller conveyer as described in detail in co-pending application, Serial No. 494,853 to Otto Berhardt, and filed March 17, 1955, now Patent No. 2,906,237. The excess zinc is then wiped from the external and internal surfaces of the galvanized conduit section by any suitable means, preferably by means of an air and steam wiping method and apparatus 89 (FIGURE 1) as described in detail in the above mentioned co-pending application.

The hot galvanized conduit sections, wiped free of excess zinc both internally and externally are engaged by the chains 91 of a conveyer and roller on runners 92 to straighten bowed conduit sections. The speed of chains 91 is controlled by a variable speed drive 93 which is set to control the degree of cooling of the galvanized conduit sections to permit spangles of zinc to form in the coating, rather than a coarse crystalline zinc structure, before quenching in the chromate bath 94.

The speed of the pintle chain conveyer 96 is controlled by variable speed control 97 to control the formation of a zinc chromate conversion coating on the galvanized conduit sections being conveyed through chromate bath 94. If the passage through bath 94 is too slow, a damp chromate coating results which etches the zinc coating. After passage through bath 94, conveyer 96 transfers the chromate conduit sections onto an inspection and unloading rack 98 as galvanized conduit sections ready for double-end threading and shipping.

In some applications of conduit sections, it is desirable to enamel rather than galvanize both the inside and the outside surface of the conduit section. In these applications, the stock conduit sections are burned free of organic matter and oxidized in oxidizing furnace 14, as previously described, and reduced in reducing furnace 24, also as previously described. The hot reduced conduit sections are removed from reducing furnace 24, through opening 101 (FIG. 7), through the wall of the furnace by reversing the direction of rotation of the rolls 48. This is done by means of reversing gears 102. The thus withdrawn conduit sections are dropped into a water tank indicated at 103 (FIGURE 1).

The cooled conduit sections are then transferred to a bath indicated at 104 containing a corrosion inhibitor, such as a soluble oil, to protect the freshly prepared surface of iron on the inside and outside of the conduit section. The thus protected conduit section is then coated internally and externally with the desired enamel by any suitable method, such as by dipping and then wiping the excess enamel from both the inside and outside surfaces of the conduit.

Water tank 103 also serves as a receiver for reduced conduit sections in cases of emergency, such as when a stoppage develops beyond the furnace 24 in the zinc pot or wiping mechanism and it is not desired to shut down the operation of the oxidizing and reducing furnaces while the stoppage is being corrected.

It will be noted that the use of transfer rollers 21 and 26 and 48 and 51 permits the use of only small openings 23, 49 and 101 through the walls of reducing furnace 24. This results in low hydrogen consumption. As indicated at 106 (FIGURE 1) hydrogen escaping through opening 23 is burned as a pilot flame for reasons of safety.

In the specific embodiment described above, the method and apparatus of the invention have been applied to coating iron or steel pipe with zinc. It will be understood, however, that the invention can be applied to placing multiple coatings of zinc or other metals or coatings on iron or steel pipe or conduit or conduit made of other metals. In addition, the invention can be used to apply coatings of various types, both metallic and non-metallic, to various types of conduit sections, both metallic and non-metallic.

Furthermore, although certain structures and design features, including structure and design of certain auxiliary equipment and drive means, have been shown in describing the specific embodiment of the invention, it will be understood that such features can be varied and modified considerably as to details and structure, as will occur to one skilled in the art. Accordingly, although a specific embodiment of the invention has been described above, it will be understood that such changes and modifications in the method and apparatus of the invention can be made within the scope of the appended claims without departing from the spirit of the invention.

We claim:
1. A method of coating metal conduit sections comprising heating and oxidizing the internal and external surfaces of the conduit sections, including the step of jetting oxidizing gas through the interior of said conduit sections, reducing the oxide coating of the oxidized conduit sections to form a fresh metal surface thereon including the step of jetting reducing gas through the interior of said conduit sections, and then dipping the conduit sections in a molten metal bath to thereby coat the interior and exterior surfaces with an adherent metal coating.

2. The method of claim 1 wherein the conduit sections are moved sequentially through an oxidizing and then a reducing furnace in aligned and parallel relation in a direction at right angles to the length of the sections, said jetting steps comprising producing a jet of gas and directing said jet parallel to the lengths of said sections, in said furnaces, in a fixed position adjacent the path of movement of said sections.

3. The method of claim 2 including the step of moving the conduit sections endwise from the oxidizing furnace to the reducing furnace.

References Cited in the file of this patent
UNITED STATES PATENTS

| | | |
|---|---|---|
| 1,737,446 | Atha | Nov. 26, 1929 |
| 2,197,622 | Sendzimir | Apr. 16, 1940 |
| 2,326,843 | Ely | Aug. 17, 1943 |
| 2,771,056 | Hess | Nov. 20, 1956 |
| 2,794,448 | Marantz | June 4, 1957 |